United States Patent [19]

Nakanishi

[11] Patent Number: 6,064,725
[45] Date of Patent: May 16, 2000

[54] COMMUNICATION TERMINAL DEVICE, CALL-HISTORY MEMORY METHOD AND CALL-HISTORY DISPLAY METHOD

[75] Inventor: Kosuke Nakanishi, Tokyo, Japan

[73] Assignee: Sony Corporation, Tokyo, Japan

[21] Appl. No.: 08/946,374

[22] Filed: Oct. 7, 1997

[30] Foreign Application Priority Data

Oct. 21, 1996 [JP] Japan ..................................... 8-297741

[51] Int. Cl.[7] .................................................. H04M 15/00
[52] U.S. Cl. ........................... 379/140; 379/354; 379/356
[58] Field of Search .................... 379/120, 127, 379/133, 140, 142, 112, 113, 93.23, 88.19–88.4, 354–356

[56] References Cited

U.S. PATENT DOCUMENTS

| | | | |
|---|---|---|---|
| 4,924,496 | 5/1990 | Figa et al. ................................ | 379/142 |
| 5,220,599 | 6/1993 | Sasano et al. ........................... | 379/142 |
| 5,228,080 | 7/1993 | Nutter et al. ............................. | 379/373 |
| 5,303,301 | 4/1994 | Takahata ................................. | 379/142 |
| 5,446,785 | 8/1995 | Hirai ....................................... | 379/142 |
| 5,568,546 | 10/1996 | Marutiak ................................. | 379/355 |
| 5,592,546 | 1/1997 | Takahashi ............................... | 379/355 |
| 5,602,908 | 2/1997 | Fan ......................................... | 379/142 |
| 5,734,706 | 3/1998 | Windsor et al. ........................ | 379/142 |
| 5,740,230 | 4/1998 | Vaudreuil ............................... | 379/88.22 |

*Primary Examiner*—Wing F. Chan
*Assistant Examiner*—Duc Nguyen
*Attorney, Agent, or Firm*—Jay H. Maioli

[57] ABSTRACT

A communication terminal device which easily provides a call-history function with superior usability. a call history having the same telephone number as the telephone number call-originated has been stored. If it has been stored, the past call history is canceled and the telephone number call-originated is stored as a call history. Thereby, storing call histories from the same party can be prevented increasing the actual number of storable files as call histories.

8 Claims, 11 Drawing Sheets

```
CALL-HISTORY-1
15TH DAY 01:30
HAJIME SONY
0350438818
```

COMMUNICATION TERMINAL DEVICE, CALL-HISTORY MEMORY METHOD AND CALL-HISTORY DISPLAY METHOD

BACKGROUND OF THE INVENTION

1. Field of the Invention

This invention relates to a communication terminal device, a call-history memory method and a call-history display method, and more particularly, is suitable for use in a portable telephone.

2. Description of the Related Art

In recent years, portable telephones have gained popularity and various functions have been added to the portable telephone. Among the various functions, for example, there is a function where a telephone number of the other party is stored together with the date and time call-originated, and it is sequentially read and displayed when a read instruction is entered, i.e., a call-history function. By providing this call-history function in a portable telephone, the user can easily know when he called and to which telephone number by viewing the display.

However, in the conventional call-history function, stored telephone numbers are only displayed in the time order of call going back to the past, so that there has been an inconvenience that it takes time until displaying a party called much before.

Furthermore, in the conventional call-history function, since the other party called is simply stored, so that in the case where it has been called the same party many times, the same telephone number has been stored repeatedly and only the same telephone number has been displayed when a call history is retrieved.

Moreover, in the conventional call-history function, the telephone number of the other party has been simply displayed, so that the party called could not be easily confirmed.

As described above, the conventional call-history function lacks usability and it has problems to be improved.

SUMMARY OF THE INVENTION

In view of the foregoing, an object of this invention is to provide a communication terminal device, a call-history memory method and a call-history display method capable of easily providing a call-history function superior to the former one in usability.

The foregoing object and other objects of the invention have been achieved by the provision of a communication terminal device for storing a telephone number call-originated in memory means as a call history, and if a read instruction is entered from operation means, for reading the call history and displaying on display means. The communication terminal device provides control means such that when the telephone number call-originated is stored in the memory means as a call history, determines whether a call history having the same telephone number as the telephone number call-originated has been stored in the memory means, and if it has been stored, cancels the past call history and stores the telephone number call-originated in the memory means as a call history.

As the above, whether a call history having the same telephone number as the telephone number call-originated has been stored or not is determined. As a result, if it has been stored, the past call history is canceled and the telephone number call-originated is stored as a call history. Thus storing call histories of the same other party can be prevented, and increasing the actual number of storable files of call history.

Furthermore, in the present invention, in a communication terminal device for storing a telephone number call-originated in memory means as a call history, and if a read instruction is entered from operation means, for reading the call history and displaying on display means, telephone-directory memory means for storing the name and telephone number of the other party as a telephone directory, and control means such that when the call history is read from the memory means and displayed on the display means, whether the telephone number of the call history has been stored or not in the telephone-directory memory means as a telephone directory is determined, and if it has been stored, the name of the other party which has been stored corresponding to the telephone number is read from the telephone-directory memory means and displayed on the display means.

As the above, whether the telephone number of the call history has been stored or not in the telephone-directory memory means as a telephone directory is determined, and if it has been stored, the name of the other party which has been stored corresponding to the telephone number is read from the telephone-directory memory means and displayed. Thereby, the user can easily know that called whom by viewing the display.

Moreover, in the present invention, in a communication terminal device for storing a telephone number call-originated together with the date and time in memory means as a call history, and if a read instruction is entered from operation means, for reading the call history and displaying on display means, control means such that if time specifying data is entered from the operation means, reads a call history at the corresponding time from the memory means and displays on the display means, is provided.

As the above, the call history at the corresponding time is read responding to the time specifying data and displayed, so that the call history of the other party that the user want to see can be displayed soon.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Whole Constitution

Figure 1:
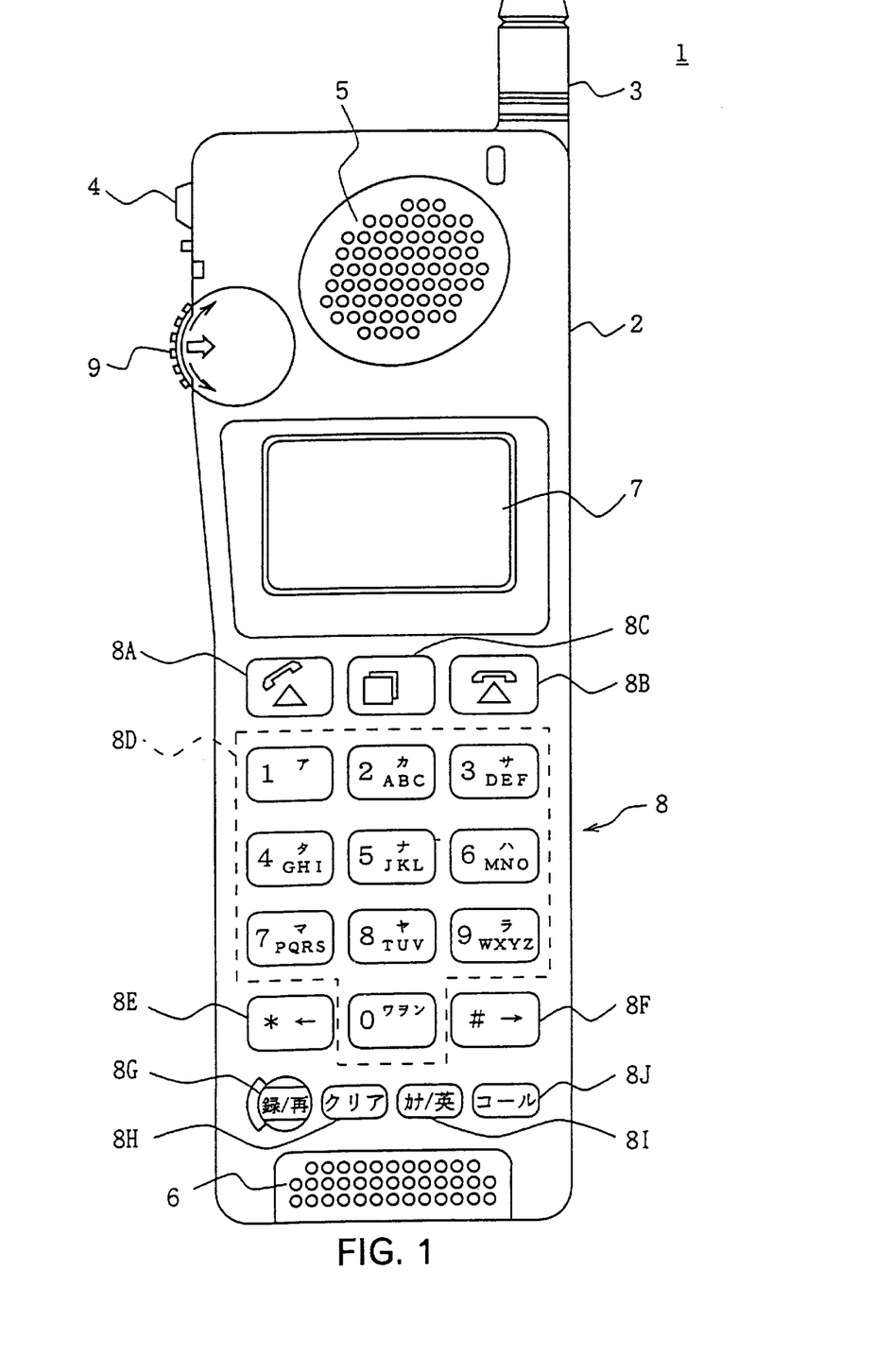
FIG. 1 is a schematic diagram showing the exterior of a portable telephone according to the embodiment of the present invention.

Referring to FIG. 1, 1 generally shows a portable telephone applying the present invention. Various parts are attached to the main body 2 which is made of synthetic resin materials. First, an antenna 3 for transmitting/receiving is attached on the upper part of the main body 2 with freely in drawing and stowing. In the portable telephone 1, radiowaves are received and transmitted from/to a base station device via the antenna 3.

A power switch 4 is provided on the side surface of the main body 2. When this power switch 4 is turned on, electric power is supplied to various electric circuits from a battery pack (not shown) which is attached on the back side of the main body 2. And the portable telephone 1 operates in an active state.

A speaker 5 is provided on the upper part of the front surface of the main body 2. When in talking mode, voice of the other party is generated from the speaker 5. Furthermore, a microphone 6 is provided on the lower part of the front surface of the main body 2. When in talking mode, voice of the user is picked up from the microphone 6.

On the middle of the front surface of the main body 2, a liquid crystal display (LCD) 7 is provided as a display means. Various data such as the state of receiving of radiowaves, a battery capacity, the telephone number when in calling mode, a telephone number entered as a telephone directory, the name of the other party, and call-history data, can be displayed on the LCD.

Moreover, various operation keys 8 are provided as operation means on the lower part of the front surface of the main body 2. Various instructions can be entered using the operation keys 8. In this embodiment, ten kinds of keys are concretely provided as the operation keys 8 as follows: a "call-originating" key 8A, "stop" key 8B, "redial" key 8C, "0–9" numerical keys 8D, "*" key 8E, "#" key 8F, "recording/reproducing" key 8G, "clear" key 8H, "kana/English" character shifting key 8I, and "call" key 8J.

Each of operation keys 8 is allotted the following function: the "call-originating" key 8A is allotted the function for entering a call-originating instruction when in call-originating to the telephone number entered, the telephone number read from a telephone-directory list, and a call history. The "stop" key 8B is allotted the function for entering a talking stop instruction and an instruction to stop the other various operation modes. And the "redial" key 8C is allotted the function for entering an instruction to read a call history by which the telephone number of the other party called past is displayed with the date and time called.

Ten numerical keys 8D are allotted the function for entering the numerical data corresponding to respective keys. Also, the numerical keys 8D are allotted the function for entering the katakana characters and the English characters. By using these keys, the name of the other party, etc., can be entered when entering in a telephone directory. For example, when an input mode is shifted to the katakana by operating the input-character shifting key 8I, letters "ア"–"オ" can be entered by the "1" key; letters "カ"–"コ" can be entered by the "2" key; letters "サ"–"ソ" can be entered by the "3" key; letters "タ"–"ト" can be entered by the "4" key; letters "ナ"–"ノ" can be entered by the "5" key; letters "ハ"–"ホ" can be entered by the "6" key; letters "マ"–"モ" can be entered by the "7" key; letters "ヤ", "ユ" and "ヨ" can be entered by the "8" key; letters "ラ"–"ロ" can be entered by the "9" key; and letters "ワ", "ヲ" and "ン" can be entered by the "0" key, respectively.

Furthermore, when the input mode is shifted to the English character by operating the input-character shifting key 8I, letters "A"–"C" can be entered by the "2" key; letters "D"–"F" can be entered by the "3" key; letters "G"–"I" can be entered by the "4" key; letters "J"–"L" can be entered by the "5" key; letters "M"–"O" can be entered by the "6" key; letters "P"–"S" can be entered by the "7" key; letters "T"–"V" can be entered by the "8" key; and letters "W"–"Z" can be entered by the "9" key, respectively.

In this connection, the first letter can be entered when pushed once, and the second letter can be entered when pushed twice; in the same manner, the letter to be entered can be changed depending on the times of pushing.

The "*" key 8E is allotted not only the function for entering a letter "*" but also the function for entering an instruction to move a cursor display toward the left. The "#" key 8F is allotted not only the function for entering a letter "#" but also the function for entering an instruction to move the cursor display toward the right. The "recording/reproducing" key 8G is allotted the function for entering an instruction to record the talking and reproduce it. The "clear" key 8H is allotted the function for entering a command for canceling the contents of display and registration. The input-character shifting key 8I is allotted the function for entering an instruction to switch the input mode to the katakana/English character. And the "call" key 8J is allotted the function for entering an instruction to read the telephone number which has been registered as a telephone directory.

On the upper part of the side surface of the main body 2, a jog-dial 9 is provided as an operation means. When the jog-dial 9 is turned to the circumference directions, an instruction to display in scroll the various display items on the liquid crystal display 7, such as a call-history list and a telephone-directory list. Furthermore, when the jog-dial 9 is pushed in the radius direction (hereinafter, this operation is referred to as click), an instruction to selectively determine the displayed item can be entered. In this connection, this click operation of the jog-dial 9 includes the function for entering a call-originating instruction and the function as a function key in similar to the "call-originating" key 8A.

Figure 2:
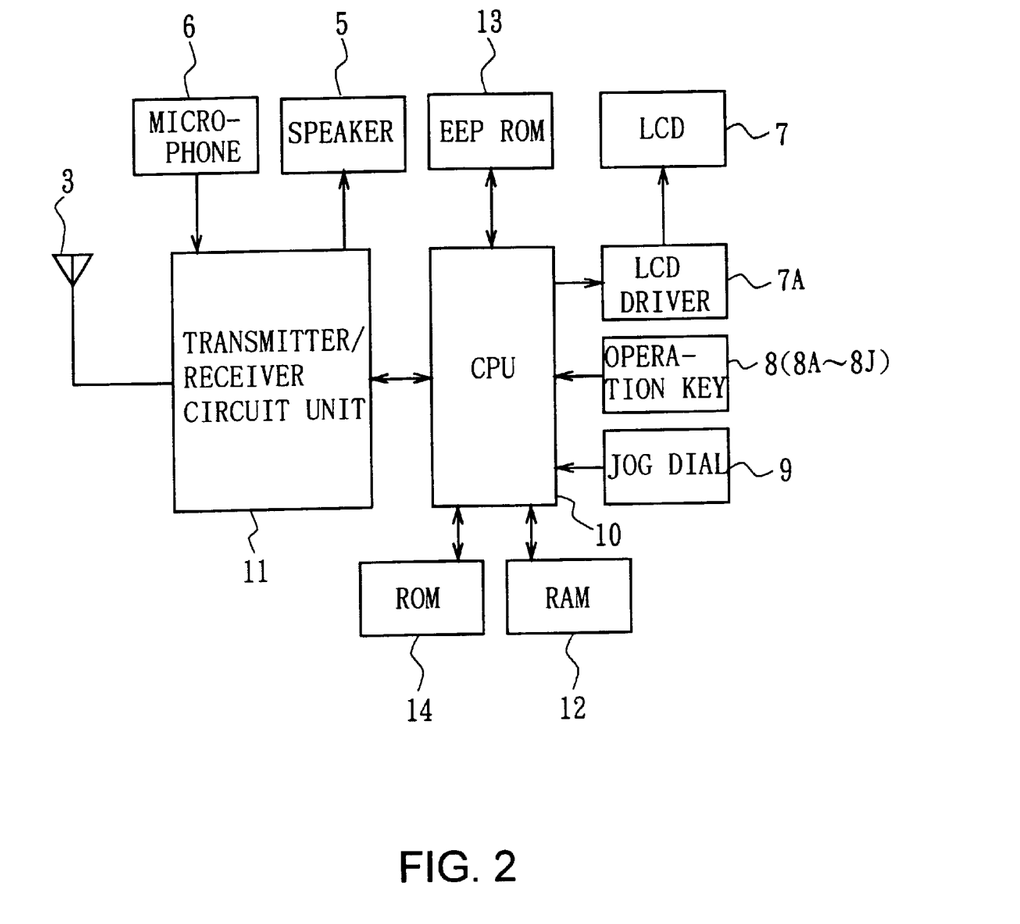
FIG. 2 is a block diagram showing the circuit configuration of the portable telephone.

Here, it will be described about a circuit configuration accompanying with FIG. 2. A circuit shown in FIG. 2 is provided in the main body 2 of the portable telephone 1. First, instruction data entered from the various operation keys 8 and the jog-dial 9 described the above are sent to a central processing unit (CPU) 10. The CPU 10 controls an LCD driver circuit 7A based on the instruction data entered and displays various information corresponding to the instruction data, e.g., a telephone number, a menu item, a call history and a telephone directory entered, on the liquid crystal display 7. Also, the CPU 10 controls a transmitter/receiver circuit unit 11 based on the instruction data entered and performs various processings such as a call-originating processing and a talking stop processing corresponding to the instruction data. The CPU 10 stores the specified data with the access to a random access memory (RAM) 12 which is the first recording means, and stores the various data such as the call history and telephone directory which would not be canceled when the power is turned off with the access to an electrically erasable and programmable read only memory (EEPROM) 13.

In this connection, the CPU 10 which conducts such control operation performs the control based on a program code stored in a read only memory (ROM) 14.

The transmitter/receiver circuit unit 11 performs call-originating by sending a control signal via the antenna 3 by the control of the CPU 10, and performs the notification of call-receiving to the CPU 10 by receiving a call-receiving signal from a base station device via the antenna 3. Also, the transmitter/receiver circuit unit 11 conducts the specified signal processing on an audio signal sent from the microphone 6 when in talking and transmits it, and also conducts the specified signal processing on a receiving signal to demodulate the audio signal and supplies to the speaker 5.

Here, the above jog-dial 9 will be described concretely. The jog-dial 9 is provided on the upper part of the left side surface of the main body 2; when the main body 2 is held with a left hand, the thumb of the left hand just reaches the jog-dial 9. Thereby, the turning operation and the clicking operation can be easily performed with the thumb of left hand while holding the main body 2, and it can be easily operated with one hand.

Figure 3:
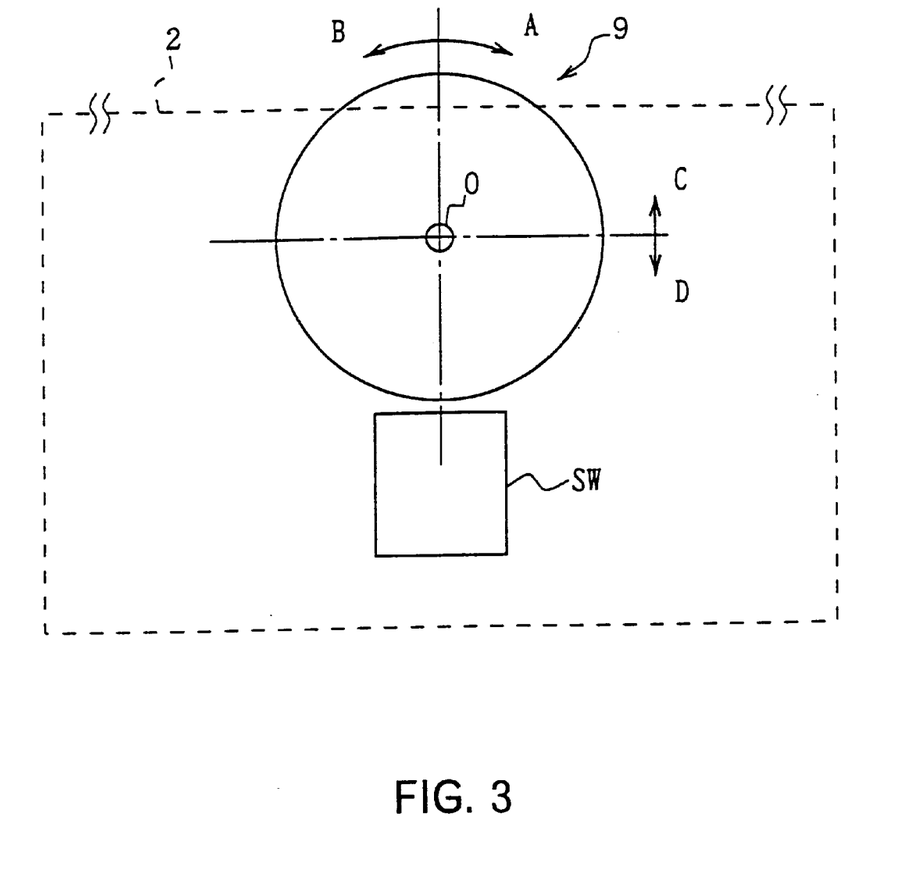
FIG. 3 is a schematic diagram explaining a jog dial mechanism.

This jog-dial 9 can be separately operated between the circumference directions and the radius directions as described above. As shown in FIG. 3, the jog-dial 9 is composed of disc parts centering a rotary shaft O and rotating in the circumference direction (arrows A and B), which consists of a rotary encoder, and a slide switch SW.

In this connection, the slide board and slide switch SW are added in the direction of an arrow C. The rotary shaft O is fixed to the slide board. Thereby, when the jog-dial 9 is pushed in the direction of an arrow D, the rotary encoder slides with the slide board in a body and depresses the slide switch SW, so that the switch can be turned on. The CPU 10 detects an on/off state of the slide switch SW to determine whether the jog-dial 9 was clicked or not.

Figure 4A:
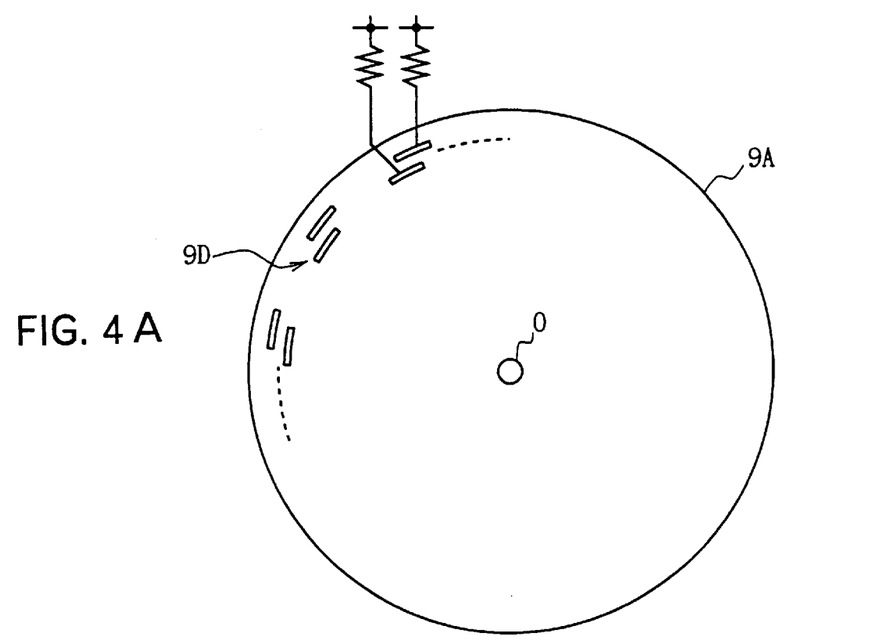
FIGS. 4A and 4B are schematic diagrams explaining the jog dial mechanism.
Figure 4B:
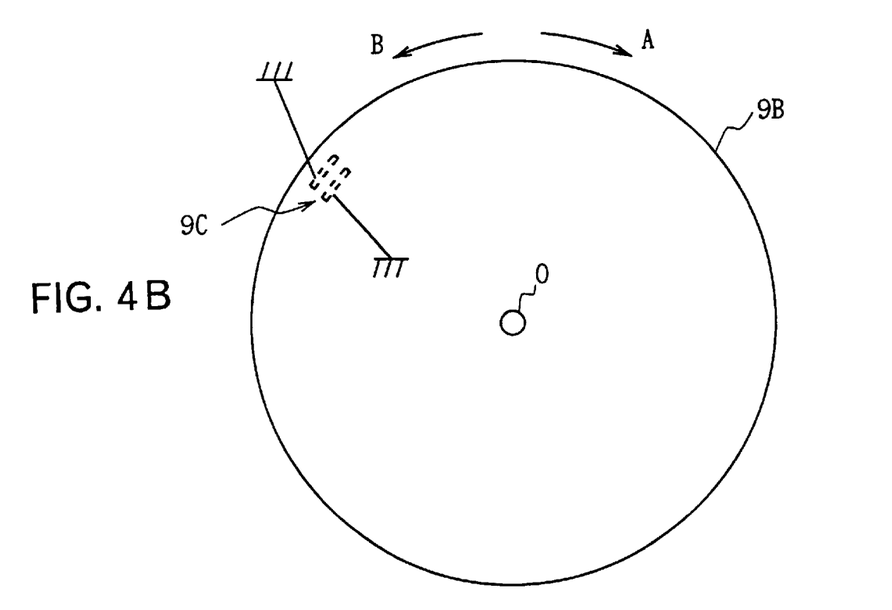

The rotary encoder slid with the slide board in a body is composed of two discs 9A and 9B as shown in FIGS. 4A and 4B. The disc 9B is a movable part laminated on the disc 9A, and attached so that relatively freely in rotation but the disc 9A is fixed on the slide board. A pair of facing electrodes 9C is provided on the disc 9B being movable. When in assembly, the facing electrodes 9C are touched and connected to twenty pairs of facing electrodes 9D which are provided along the circumference of the disc 9A. Note that, the facing electrodes 9D provided on the fixed disc 9A are formed such that its inner circumference and its outer circumference are shifted in location.

Figure 5A:
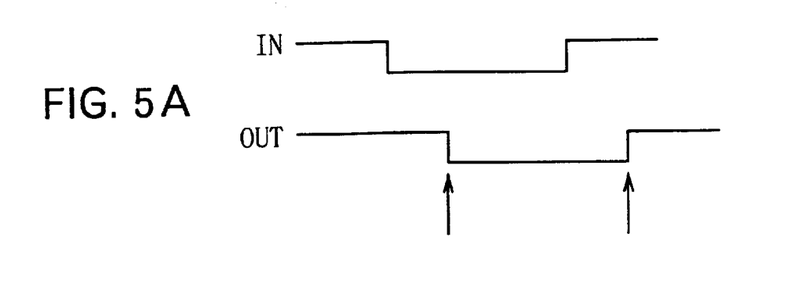
FIGS. 5A and 5B are output-waveform diagrams explaining the jog dial mechanism.
Figure 5B:
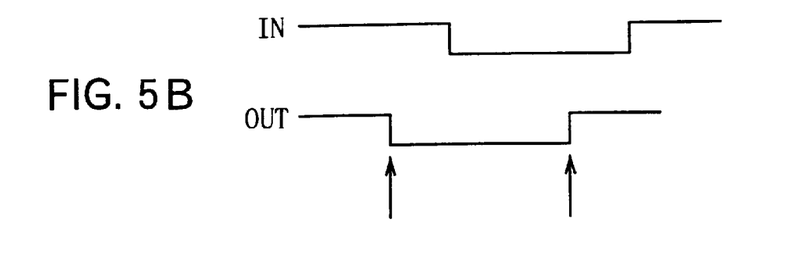

Accordingly, as shown in FIG. 5A, when the jog-dial 9 is turned toward an arrow A, on a potential generated from the facing electrodes 9D, a potential on the inner circumference side is firstly fallen to the grounded potential. On the contrary, as shown in FIG. 5B, when turned toward an arrow B, a potential on the outer circumference side is firstly fallen to the grounded potential. By utilizing this, which potential is firstly fallen on the inner circumference side or the outer circumference side is detected, so that the turned direction of the jog-dial 9 is detected. Furthermore, a quantity of rotation of the jog-dial 9 can be detected by counting the number of pulses oscillated from the electrodes on the outer circumference side.

A typical example of operation using the jog-dial 9 will be described hereinafter. When the jog-dial 9 is turned up and down in the circumference directions when the various items are displayed on the liquid crystal display 7, the cursor displayed on the liquid crystal display 7 can be moved upward and downward. In this state, if the jog-dial 9 is clicked, the reading of particular data of the item on the cursor display and the terms in a lower hierarchy of the clicked item can be instructed to the CPU 10. When the call history or the telephone directory is displayed, if the jog-dial 9 is turned up and down, page scroll can be instructed to the CPU 10, and its preceding screen or following screen can be displayed as turning the page. In this embodiment, if the jog-dial 9 is clicked in the state where the desired telephone number is displayed, it can be selected and called.

(2) Call-History Function

Figure 6:
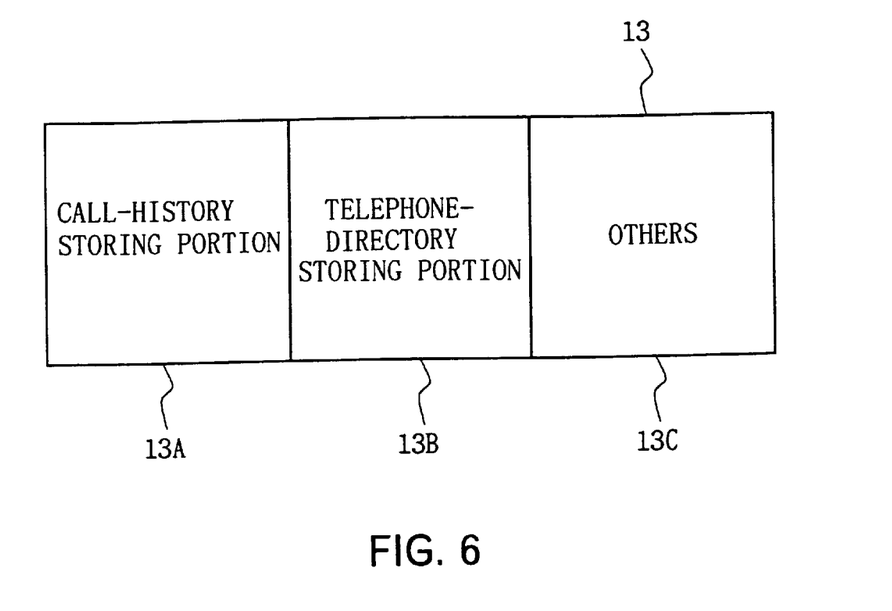
FIG. 6 is a schematic diagram explaining memory areas for call history and telephone directory.

In this term, it is described about a call-history function on the portable telephone 1. As shown in FIG. 6, the EEPROM 13 in which call-history data is stored has two areas; a call-history storing portion 13A and a telephone-directory storing portion 13B, and storing the data corresponding to respective memory areas. In this connection, in the portable telephone 1, a memory capacity capable of storing a history for 500 files is maintained as the call-history storing portion 13A, and a memory capacity capable of storing a telephone directory for 300 files is maintained as the telephone-directory storing portion 13B.

When a telephone directory is registered, the name of the other party and his telephone number entered by operating the operation key 8 is stored in the telephone-directory storing portion 13B as a telephone directory.

On the other hand, when a call history is registered, the telephone number of the other party call-originated is stored with the data and time called in the call-history storing portion 13A as a call history. At this time, as shown in FIGS. 7A–B, if the telephone number has call-originated already, only the new call history is stored and the past call history is canceled.

Figures 7A, 7B:
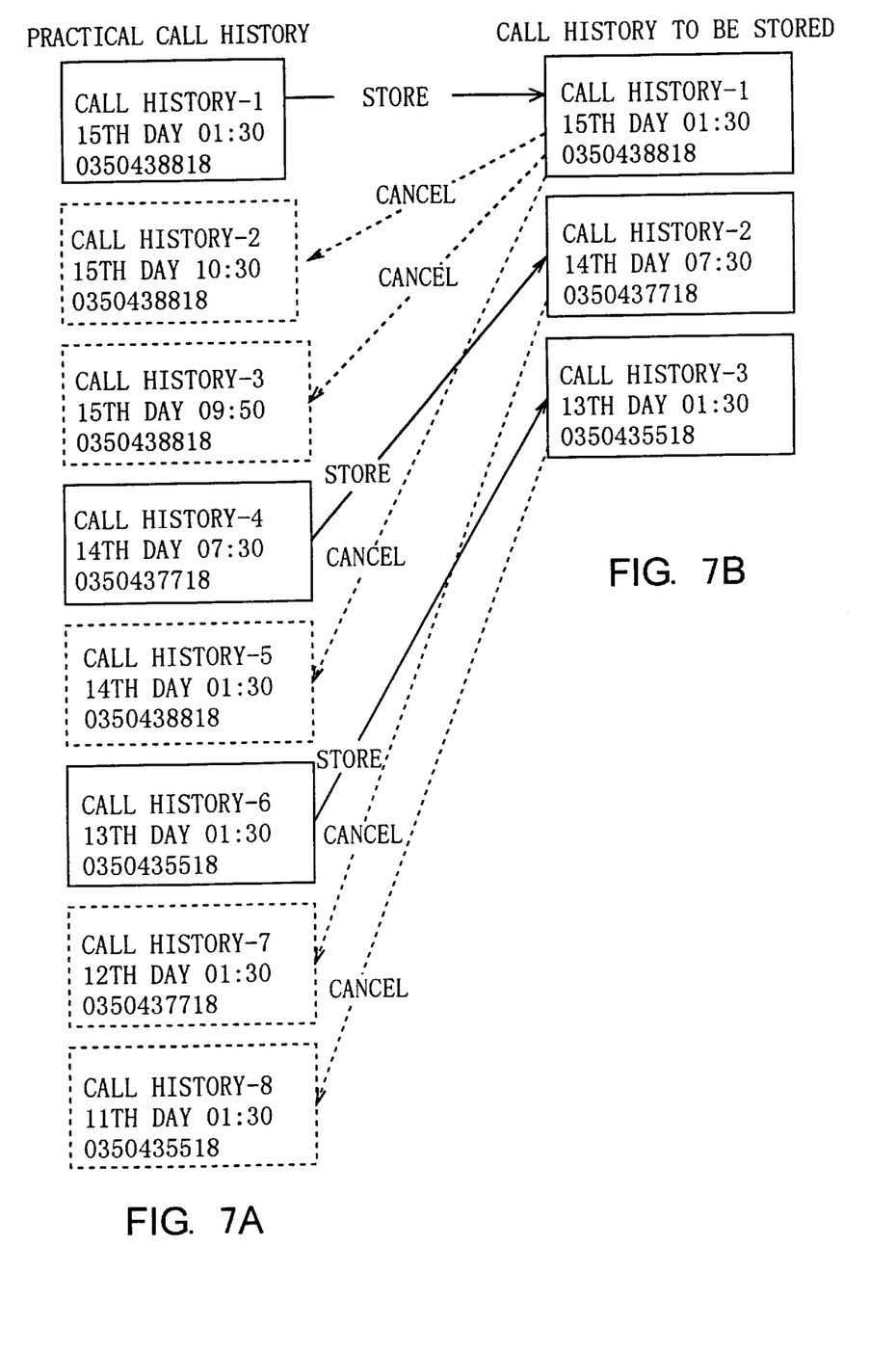
FIGS. 7A–B are schematic diagrams explaining a call-history memory method.

For instance, as shown in FIG. 7A, even if the following call histories are actually found: "15th day, 01:30, 0350438818", "15th day, 10:30, 0350438818", "15th day, 09:50, 0350438818", "14th day, 07:30, 0350437718", "14th day, 01:30, 0350438818", "13th day, 01:30, 0350435518", "12th day, 01:30, 0350437718", and "11th day, 01:30, 0350435518", only three call histories of them, the first, the fourth and the sixth call histories are stored, as shown in FIG. 7B.

That is, in the above actual call histories, the second, the third and the fifth call histories are not only the same party as the first call history but also they are older than the first call history, so that they are canceled. Besides, the seventh call history is not only the same party as the fourth call history but also it is temporary the past, so that it is canceled. From the similar reason, the eighth call history is also canceled. In this way, in the portable telephone 1, if call histories having the same party are found, only the newest call history is remained; thereby, the call histories of different parties are remained.

Such call-history storing processing is basically conducted by the CPU 10. At this time, the CPU 10 collates the telephone number call-originated at present with the call-history list stored in the call-history storing portion 13A, and determines whether a call history of the same telephone number as the telephone number called at present has been stored or not. If it has been stored, it is canceled and a call history of the telephone number called at present is newly stored. But if the call history of the same telephone number has not been stored, the call history of the telephone number called at present is newly stored without canceling processing. By performing the above storing processing, in the portable telephone 1, only call histories of different parties are remained.

Figure 8:
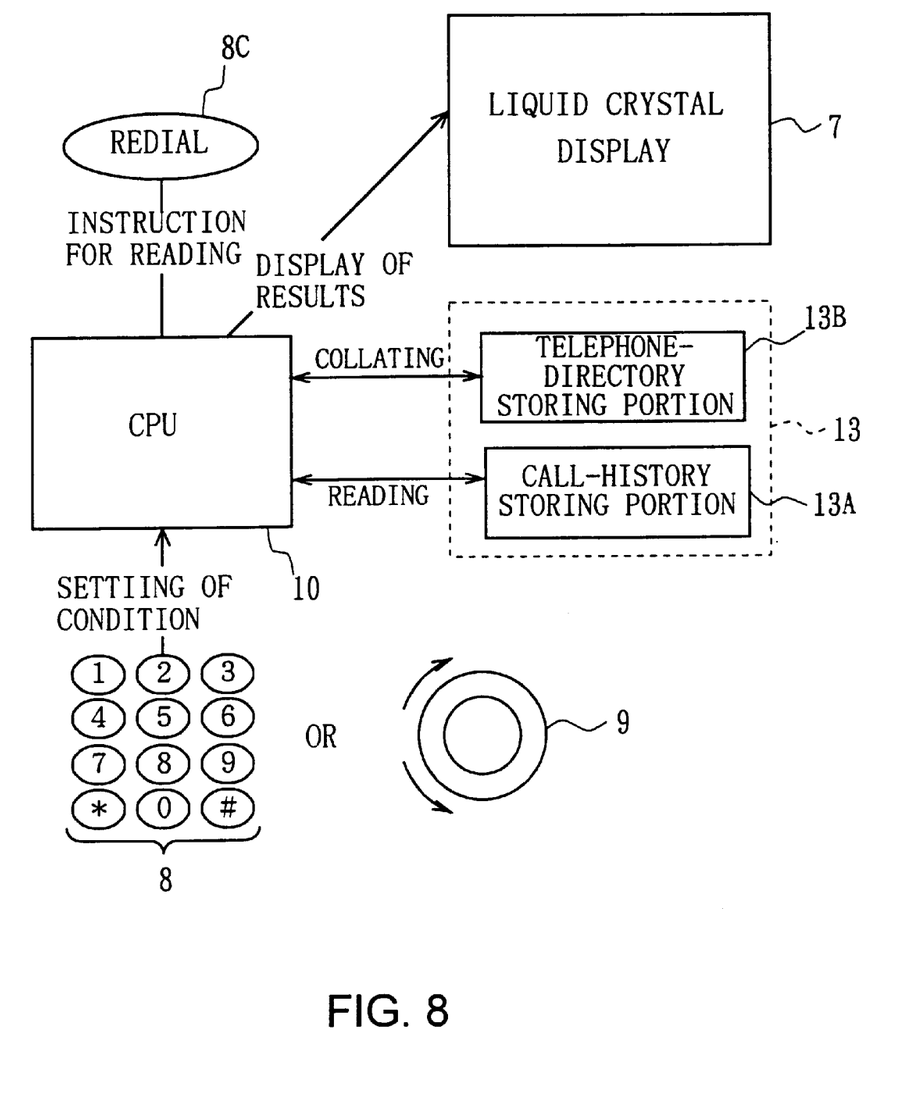
FIG. 8 is a schematic diagram explaining a call-history display method.

Here, the display of the call history will be described with reference to FIG. 8. As shown in FIG. 8, if the read instruction of the call history is entered from the "redial" key 8C or setting of condition is entered from the operation key 8 or the jog-dial 9, the CPU 10 reads the call history corresponding to them with the access to the call-history storing portion 13A, collates the call history read with the telephone-directory list which has been stored in the telephone-directory storing portion 13B, and displaying the display contents corresponding to the result of the collation on the liquid crystal display 7.

Figure 9:
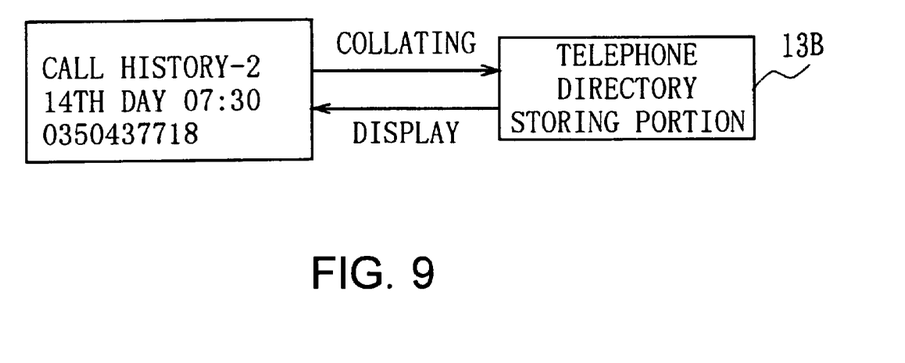
FIG. 9 is a schematic diagram explaining the display of call history with a telephone number.

At this time, there are some methods of displaying the call history conducted by the CPU 10 as described below. Firstly, as shown in FIG. 9, a call history read is collated with the telephone list stored in the telephone-directory storing portion 13B, and it is determined whether the telephone number in the call history has been stored or not as a telephone directory. If it has not been stored, the call history read is displayed as it is and a call history with a telephone number is displayed.

Figure 10:
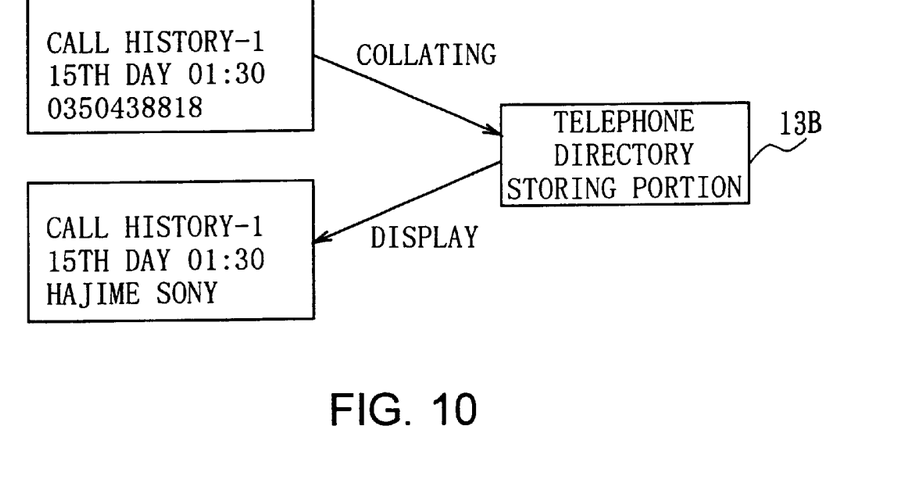
FIG. 10 is a schematic diagram explaining the display of call history with the name of the other party.

Furthermore, as shown in FIG. 10, the read call history is collated with the telephone list stored in the telephone-directory storing portion 13B, and it is determined whether the telephone number in the call history has been stored or not as a telephone directory. If it has been stored, the name of the other party which has been stored corresponding to the telephone number is read from the telephone directory storing portion 13B, and a call history is displayed using this, namely, the name of the other party is displayed instead of the telephone number.

Figure 11:
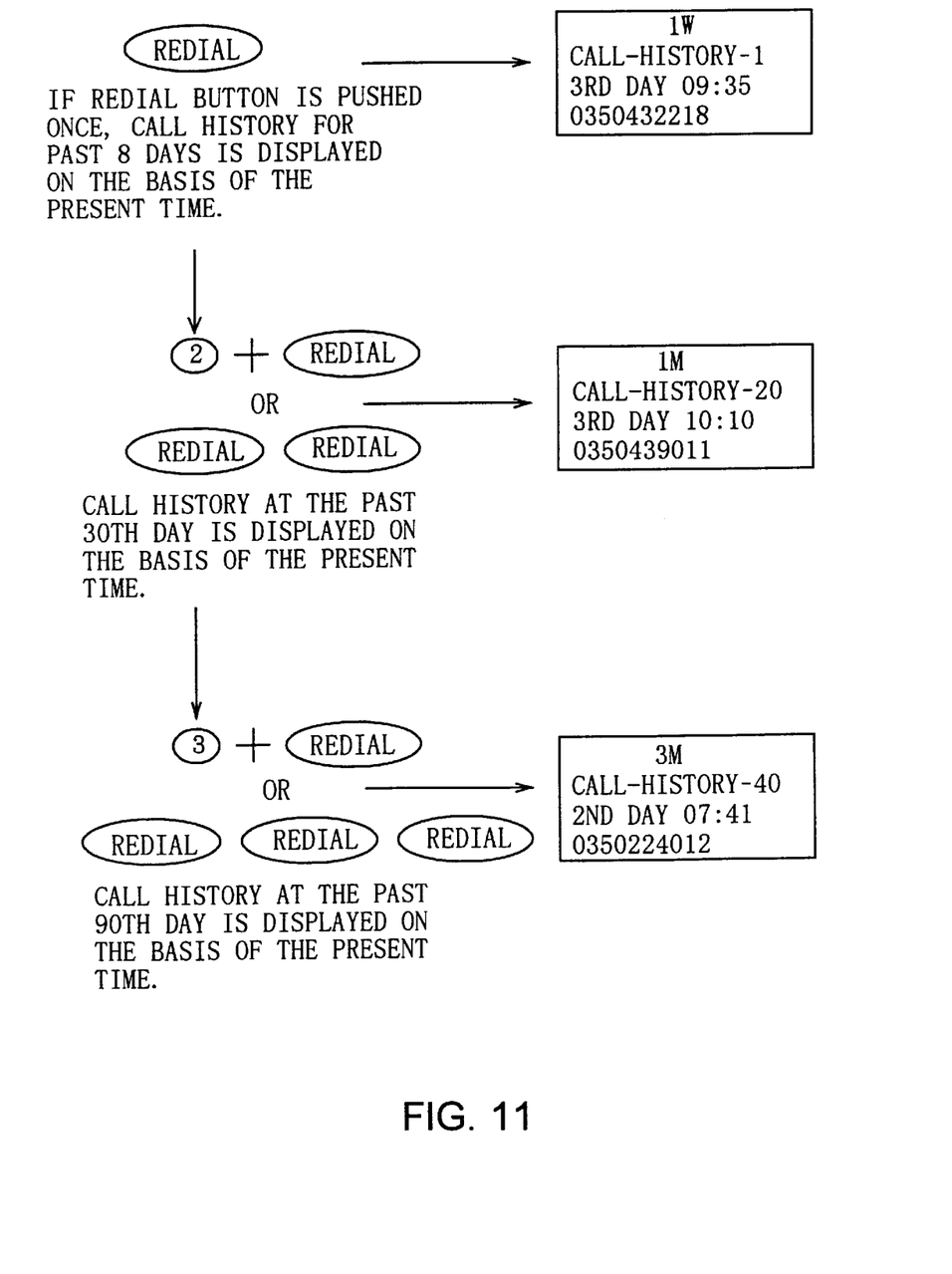
FIG. 11 is a schematic diagram explaining the display of call history based on the specified time.

Moreover, as shown in FIG. 11, in the portable telephone 1, when the "redial" key 8C is pushed once, it enters a one-week mode in which a call history for past eight days from the present is displayed. In this state, if the jog-dial 9 is turned up and down, call histories for eight days are sequentially page-scrolled. Note that, in this one-week mode, "1W" is displayed on the upper part of the screen of the liquid crystal display 7; thus the user can easily know it is one-week mode.

In this state, if the "2" key and the "redial" key 8C are pushed or the "redial" key 8C is pushed twice, it enters a one-month mode in which a call history at the past thirtieth day from the present is displayed. At this time, a call history of just thirty days before from the present is displayed on the screen. In this state, if the jog-dial 9 is turned up and down, call histories its before and after are sequentially page-scrolled. In this connection, when it is in the one-month mode, "1M" is displayed on the upper part of the screen of the liquid crystal display 7; thus the user can easily know it is one-month mode.

Furthermore, if the "3" key and the "redial" key 8C are pushed or the "redial" key 8C is pushed three times, it enters a three-month mode in this time, in which a call history at the past ninetieth day from the present is displayed. In this state, if the jog-dial 9 is turned up and down, call histories before and after are sequentially page-scrolled. Note that, when it is in the three-month mode, "3M" is displayed on the upper part of the screen of the liquid crystal display 7; thus the user can easily know it is one-month mode.

In this manner, in the portable telephone 1, when displaying a call history, if time specifying data is entered, a call history corresponding to the time is read and displayed. Thereby, call histories which were called during the time when the user would like to see can be displayed together. Thus the user can see the desired call history immediately.

Figure 12:
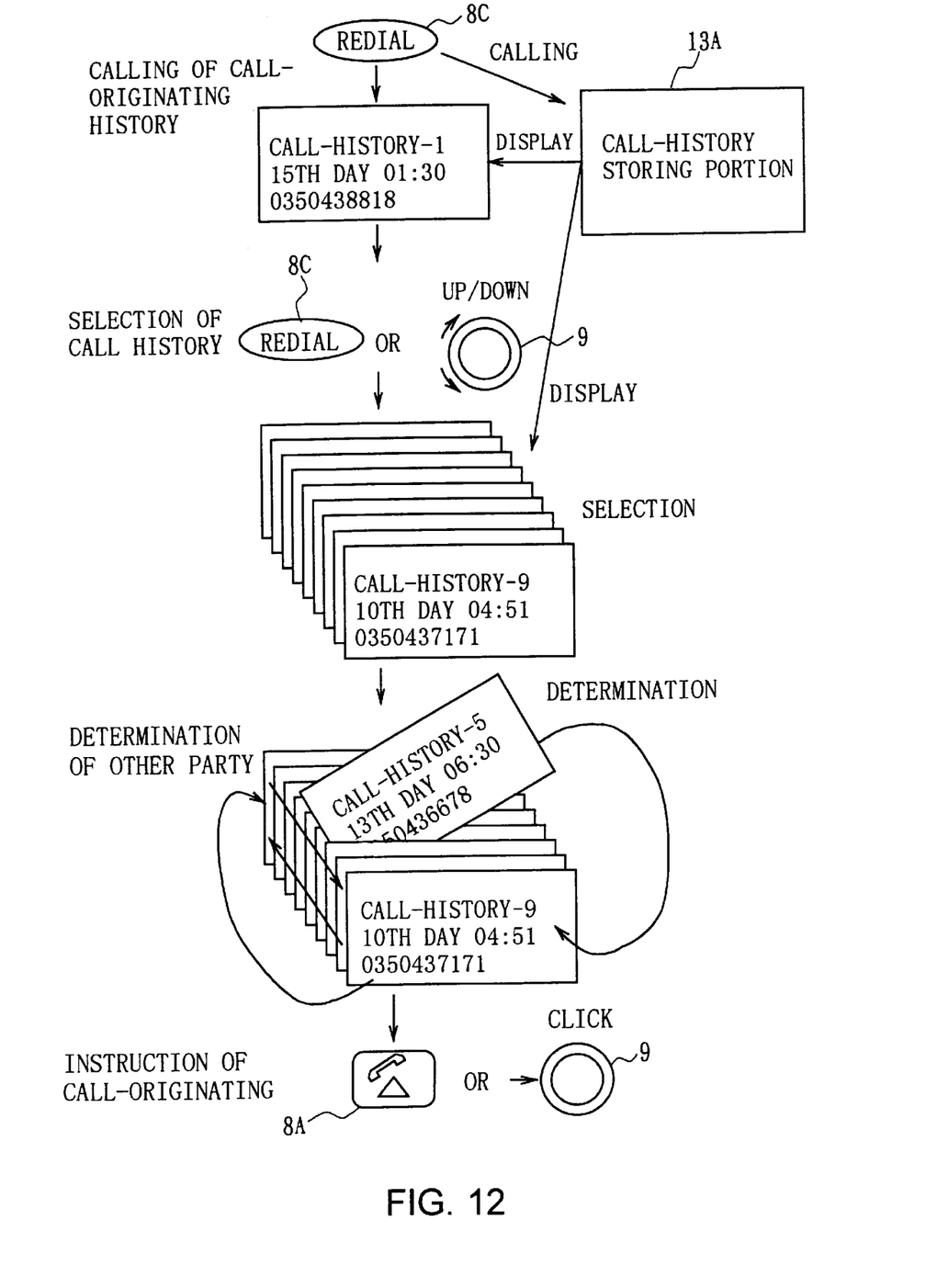
FIG. 12 is a schematic diagram explaining the originating processing using the call history.

The operational sequence of call-originating processing using the call history will be described with reference to FIG. 12. If the "redial" key 8C is pushed at first, the reading of call history is instructed and the call history of the last other party is displayed on the liquid crystal display 7 from the call-history storing portion 13A. In this state, if the jog-dial 9 is turned up and down, call histories are sequentially page-scrolled. In this connection, at this time, the time selection may be conducted by operating the "redial" key 8C as described above, and jumping to the call history of the desired time.

The call history of the other party to be call-originated now can be displayed by the above operation of the jog-dial 9 or the "redial" key 8C. For example, as shown in FIG. 12, when call-originating to the party of the fifth call history, it is displayed on the screen of the liquid crystal display 7. After the desired party has been displayed as the above manner, if a call-originating instruction is entered by pushing the "call-originating" key 8C or clicking the jog-dial 9, the CPU 10 receives the instruction and call-originates to the party of the call history displayed. That is, the CPU 10 drives the transmitter/receiver circuit unit 11 with the telephone number of the party displayed, and call-originates to him. In this manner, it can be call-originated from a call history, so that the user can easily call-originate even if the telephone number is not remembered, provided that the user has called the party in the past.

(3) Operations and Advantages

According to the above structure, in the portable telephone 1, when a telephone number which has just call-originated is stored as a call history, the telephone number call-originated is collated with a call-history list stored in the call-history storing portion 13A, whether a call history having the same telephone number as the telephone number now call-originated has been already stored or not. If it has been stored, the past call history stored is canceled and the call history of the telephone number now call-originated is newly stored. If it has been not stored, the call history of the telephone number now call-originated is stored without canceling. As a result, storing call histories of the same other party can be prevented, and increasing the actual number of files of call history stored. Furthermore, since the call history of the same other party is not stored, when displaying call history, it can be prevented that call histories of the same party are displayed many times; thus a call history of the desired party can be retrieved rapidly.

In this connection, in the former manner, a call history of the other party call-originated has been simply stored, so that if calling the same party in succession more than the storable number of files for the call-history storing portion, only call histories of the same other party have been stored and it might be impossible to call another party by call-originating from a call history. However, in the portable telephone 1 according to the present embodiment, call histories of the same party are never stored, so that such problem can be avoided. That is, in this portable telephone 1, the actual number of storable files of call history can be increased by effectively using the call-history storing portion 13A. Furthermore, the number of files capable of call-originating from a call history can be increased; thus its usability can be more improved.

In the portable telephone 1, when displaying a call history, a call history read is collated with a telephone-directory list stored in the telephone-directory storing portion 13B, and whether the telephone number of the call history has been stored or not as a telephone directory is determined. If it has been stored as a telephone directory, the name which has been stored corresponding to that telephone number is displayed on the liquid crystal display 7. Thus the user can easily know the party called in the past by viewing the name displayed.

Furthermore, in the portable telephone 1, when displaying the call history, if time specifying data is entered, a call history corresponding to the time is read and displayed. Thereby, even if the user wants to see a call history of long before, the call history can be displayed soon, and providing to take the time for displaying as the former one.

According to the above structure, when the telephone number which has just call-originated is stored as a call history, whether a call history having the same telephone number as the telephone number call-originated has been stored or not is determined. If it has been stored, the past call history is canceled and the telephone number call-originated is stored as a call history. Thereby, storing call histories of the same party can be prevented and the actual number of storable files of call history can be increased, also, a call history of the desired party can be retrieved immediately.

When displaying a call history, whether a telephone number of the call history read has been stored or not as a telephone directory is determined. If it has been stored, the name of that party which has been stored corresponding to the telephone number is read and displayed. Thereby, the user can easily know the party called by viewing the name of that party displayed.

Moreover, when displaying a call history, the call history corresponding to the time is read and displayed based on the time specifying data entered; thus a call history of the desired party can be displayed soon.

Thereby, a call history function which is superior to the former one in usability can be easily provided.

(4) Other Embodiments

Figure 13:
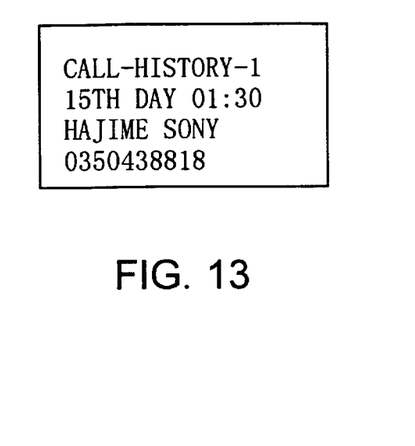
FIG. 13 is a schematic diagram explaining the case of displaying the telephone number and the name of the other party simultaneously.

The embodiment described above has dealt with the case where when the telephone number of the call history read has been stored as a telephone directory, the name of the party registered is displayed instead of the telephone number. However, the present invention is not only limited to this but also, as shown in FIG. 13, if the telephone number of the call history read has been stored as a telephone directory, the name of the party and the telephone number may be displayed simultaneously. Thereby, who called and from which telephone can be recognized at a glance; thus the usability can be more improved.

Furthermore, the present invention is not only limited to the above, in the case where a plurality of telephone numbers are registered as a telephone directory of one party, the name of the party and the telephone number called last time may be displayed simultaneously, and in this state, the telephone number to be displayed may be switched to the other telephone number which has been stored, in similar to the above modification. For example, it is assumed that as the name of the other party, "Hajime Sony", the telephone number of his home, "0350438818"; the telephone number of his office, "0350112345"; the number of his facsimile telephone, "0350114567"; and the telephone number of his portable telephone, "0501103884" have been stored as a telephone directory. And it is assumed that a call was originated to the telephone of his home (telephone number: 0350438818) last time, and it has been stored as a call history.

Figure 14:
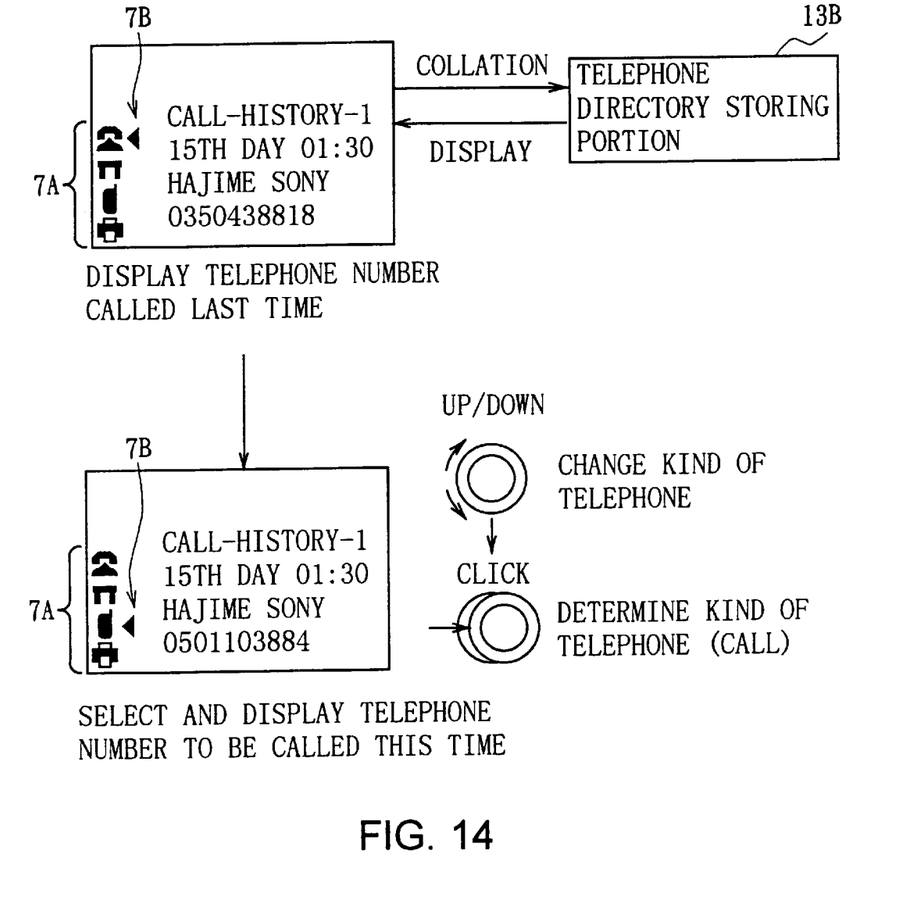
FIG. 14 is a schematic diagram explaining the case of displaying the other telephone number which has been entered.

Here, if the read instruction of a call history is entered by the "redial" key 8C, the CPU 10 received it reads the call history from the call-history storing portion 13A and collates with a telephone directory stored in the telephone-directory storing portion 13B, and then displays the call history on the liquid crystal display 7. At this time, the CPU 10 displays the call history on the liquid crystal display 7 as shown in FIG. 14. That is, in this case, since the telephone number "0350438818" has been stored in the telephone directory, the name of the other party, "Hajime Sony" is displayed with the telephone number called last time, "0350438818". Moreover, with respect to this party, a plurality of telephone numbers has been stored, so that pictorial characters 7A which show a kind of telephones are displayed to show that a plurality of telephone numbers have been registered, and also a pointer 7B is additionally displayed to the pictorial character 7A to show that the telephone number displayed is which kind of telephone. Note that, each pictorial character 7A means the telephone of his home, the telephone of his office, his portable telephone, and his facsimile telephone, from the uppermost, respectively. In short, in this example shown in FIG. 14, the user can easily know that the user called the telephone of Hajime Sony's home at 1:30 on the 15th day.

Here, if the predetermined operation is performed, e.g., if the "call" key 8J is pushed, the CPU 10 shifts to a telephone number switching mode in which the display is switched to the other telephone number. In this mode, if the jog-dial 9 is turned up and down, the CPU 10 changes the position of the pointer 7B depending on the operation, and displays the telephone number of the telephone specified by the pointer 7B. For example, as shown in FIG. 14, if the pointer 7B is moved on the portable telephone, the telephone number of his portable telephone, "0501103884" is displayed.

In this manner, after the telephone to be called now has been displayed by operating the jog-dial 9, if the jog-dial 9 is clicked, the CPU 10 determines that the telephone number has determined and call-originates to the telephone number.

By providing the CPU 10 such that in the case where a plurality of telephone numbers have been stored as one party as described above, if the telephone-number switching instruction is entered, the CPU 10 displays the other telephone numbers stored responding to the instruction, and then if a telephone-number determining instruction is entered, it call-originates to the telephone number determined, so that it can easily calls the other telephone of the party called before.

Moreover, the embodiments described above have dealt with the case where when storing a call history, if a call history having the same telephone number as the telephone number to be stored has been stored already, the past call history is canceled. However, the present invention is not only limited to this but also the order of call histories may be changed according to the frequency of calling based on the number of times of canceling. For example, in the case where the order is changed from the least number of times of calling based on the number of times of canceling, when calling the party whom does not calls often, that party can be displayed immediately and calling him.

Furthermore, the embodiments described above have dealt with the case of storing the call history and telephone directory in the EEPROM 13. However, the present invention is not only limited to this but also, provided that it is a memory means capable of storing when the power is turned off, it may be stored the call history and telephone directory in the other memory means. Moreover, it is not only limited to the above, the call history and the telephone directory can be stored in memory means severally.

Moreover, the embodiments described above have dealt with the case where the present invention is applied to the portable telephone 1. However, the present invention is not only limited to this but also it may be applied to such as a facsimile device and a data terminal device having a communicational function. In short, the present invention can be widely applied to a communication terminal device having a function such that call-originates to the specified other party, and storing and displaying its call history.

According to the present invention as described above, whether a call history having the same telephone number as the telephone number call-originated has been stored or not. If it has been stored, the past call history is canceled and the telephone number call-originated is stored as a call history, so that it can be prevented that call histories of the same party are stored, and increasing the actual number of storable files of call history. Thereby, a call history function which is superior to the former one in usability can be easily provided.

Furthermore, according to the present invention, whether the telephone number of a call history has been stored or not as a telephone directory. If it has been stored, the name of the other party who has been stored corresponding to the telephone number is read from the telephone-directory storing means and displayed; thus the user can easily know that the user call whom by viewing the display. Thereby, a call history function which is superior to the former one in usability can be easily provided.

Moreover, according to the present invention, the call history at the corresponding time is read according to the time specifying data and displayed it, so that the call history of the other party that the user want to see can be displayed soon. Thereby, a call history function which is superior to the former one in usability can be easily provided.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication terminal device comprising:
    call-history memory means for storing an outgoing call history including a telephone number and a date and time of an outgoing call to a called party;
    operation means for entering instructions and placing said outgoing call;
    display means for reading said outgoing call history from said call-history memory means and for displaying said outgoing call history when a read instruction is entered using said operation means;
    determining means for determining whether said call history includes said telephone number of said outgoing call as a previously stored telephone number when storing said telephone number of said outgoing call in said outgoing call history, wherein said previously stored telephone number includes a previously stored date and time; and
    control means for updating said previously stored date and time of said previously stored telephone number in said outgoing call history with said date and time when storing said telephone number of said outgoing call in said outgoing call history when it is determined by said determining means that said outgoing call history includes said telephone number.

2. The communication device according to claim 1, further comprising:
    telephone-directory memory means for storing a name and a corresponding telephone number of said called party to form a telephone directory, wherein
    said determining means determines whether said telephone number of said outgoing call history has been previously stored in said telephone directory when reading said outgoing call history from said call-history memory means for display by said display means, and
    said control means reads said name of said called party corresponding to said telephone number from said telephone-directory means and displays said name on said display means when it is determined by said determining means that said telephone number of said outgoing call history has been previously stored in said telephone directory.

3. The communication terminal device according to claim 2, wherein when a call-originating instruction is entered using said operation means, said control means calls said party of said displayed outgoing call history.

4. The communication terminal device according to claim 2, wherein when a plurality of telephone numbers have been stored corresponding to said name of said called party and a telephone-number switching instruction is entered using said operation means, said control means displays said plurality of stored telephone numbers on said display means in response to said telephone-number switching instruction, and when a telephone-number selecting instruction is entered using said operation means, said control means calls a selected one of said plurality of telephone numbers.

5. The communication terminal device according to claim 1, wherein said outgoing call history further includes a date, and
    said control means controls said display means to read said outgoing call history for dates corresponding to a time period from said memory means and displays said outgoing call history corresponding to said time period on said display means when said time period is entered using said operation means.

6. A method for forming and displaying a call-history comprising the steps of:
    storing an outgoing call history including a telephone number and a date and time of an outgoing call to a called party;
    determining whether said call history includes said telephone number of said outgoing call as a previously stored telephone number when storing said telephone number of said outgoing call as said outgoing call history, wherein said previously stored telephone number includes a previously stored date and time;
    updating said previously stored date and time of said previously stored telephone number in said outgoing call history with said date and time when storing said telephone number of said outgoing call in said outgoing call history when it is determined that said outgoing call history includes said telephone number; and
    reading and displaying said outgoing call history in response to a read instruction.

7. The method for forming and displaying a call-history according to claim 6, further comprising the steps of:
    storing a name and a corresponding telephone number of said called party to form a telephone directory;

determining whether said telephone number of said outgoing call history has been previously stored in said telephone directory when reading said outgoing call history; and reading said name of said called party from said telephone directory and displaying said name on said display means when it is determined that said telephone number of said outgoing call history has been previously stored in said telephone directory.

8. The method for forming and displaying a call-history according to claim 6, wherein said outgoing call history further includes a date, and further comprising the step of reading said outgoing call history for dates corresponding to a time period and displaying said outgoing call history corresponding to said time period.

* * * * *